US012623924B2

(12) United States Patent
Cruz et al.

(10) Patent No.: US 12,623,924 B2
(45) Date of Patent: May 12, 2026

(54) DESALINATION AND/OR PURIFICATION DEVICE, DESALINATION AND/OR PURIFICATION CARBON MEMBRANE, AND METHOD OF DESALINATING AND/OR PURIFYING A LIQUID

(71) Applicants: PERA COMPLEXITY, B.V., Amsterdam (NL); King Abdullah University of Science and Technology, Jeddah (SA); Universität Zürich, Zurich (CH)

(72) Inventors: Aluizio M. Cruz, Long Beach, CA (US); Andrea Fratalocchi, Thuwal (SA); Marcella Bonifazi, Zurich (CH); Valerio Mazzone, Zurich (CH); Christof Aegerter, Zurich (CH)

(73) Assignees: PERA COMPLEXITY, B.V., Amsterdam (NL); King Abdullah University of Science and Technology, Jeddah (SA); Universität Zürich, Zurich (CH)

( * ) Notice: Subject to any disclaimer, the term of this patent is extended or adjusted under 35 U.S.C. 154(b) by 267 days.

(21) Appl. No.: 18/258,114

(22) PCT Filed: Dec. 17, 2021

(86) PCT No.: PCT/EP2021/086420
§ 371 (c)(1),
(2) Date: Jun. 16, 2023

(87) PCT Pub. No.: WO2022/129480
PCT Pub. Date: Jun. 23, 2022

(65) Prior Publication Data
US 2024/0051845 A1 Feb. 15, 2024

(30) Foreign Application Priority Data
Dec. 17, 2020 (EP) ..................................... 20214979

(51) Int. Cl.
*C02F 1/14* (2023.01)
*B01D 5/00* (2006.01)
(Continued)

(52) U.S. Cl.
CPC .............. *C02F 1/14* (2013.01); *B01D 5/0066* (2013.01); *B01D 61/36* (2013.01);
(Continued)

(58) Field of Classification Search
CPC ................................ B01D 5/0066; C02F 1/14
See application file for complete search history.

(56) References Cited

U.S. PATENT DOCUMENTS

| | | | | |
|---|---|---|---|---|
| 3,501,381 | A | 3/1970 | Delano | |
| 2018/0356127 | A1* | 12/2018 | Hu | B01D 1/0005 |
| 2021/0206658 | A1* | 7/2021 | Budil | B01D 5/006 |

FOREIGN PATENT DOCUMENTS

| | | |
|---|---|---|
| CN | 110194499 A | 9/2019 |
| CN | 110579028 B | 9/2020 |
| CN | 111908539 A | 11/2020 |

OTHER PUBLICATIONS

Arunkumar et al., "Capillary flow-driven efficient nanomaterials for seawater desalination: Review of classifications, challenges, and future perspectives"; Renewable and Sustainable Energy Reviews, Elseviers Science, New York, NY, US, vol. 138, Nov. 12, 2020.
(Continued)

*Primary Examiner* — Renee Robinson
(74) *Attorney, Agent, or Firm* — Hoffman Warnick LLC

(57) ABSTRACT

The present invention relates to a desalination and/or purification device, a desalination and/or purification carbon membrane, and a method of desalinating and/or purifying a liquid by using such a desalination and/or purification device. In various illustrative embodiments, a desalination and/or purification device is provided, the desalination and/
(Continued)

or purification device comprising a carbon membrane body comprising a carbon surface, and a structure of microchannels and/or nanochannels at least partially permeating the carbon membrane body and ending at openings at the carbon surface, a liquid transportation structure extending at least partially through the carbon membrane body without being exposed at the carbon surface, and a condenser arranged above the carbon membrane body. The liquid transportation structure is arranged and configured to supply the structure of microchannels and/or nanochannels of the carbon membrane body with a liquid to be desalinated and/or purified and the structure of microchannels and/or nanochannels of the carbon membrane body may be an at least two-level disordered network of channels.

20 Claims, 4 Drawing Sheets

(51) Int. Cl.

| | |
|---|---|
| *B01D 61/36* | (2006.01) |
| *B01D 71/02* | (2006.01) |
| *C02F 1/04* | (2023.01) |
| *C02F 1/28* | (2023.01) |
| *C02F 103/08* | (2006.01) |

(52) U.S. Cl.
CPC .......... *B01D 71/0212* (2022.08); *C02F 1/043* (2013.01); *C02F 1/283* (2013.01); *B01D 2313/22* (2013.01); *B01D 2313/367* (2022.08); *C02F 2103/08* (2013.01)

(56) References Cited

OTHER PUBLICATIONS

Cao et al., "Advances in solar evaporator materials for freshwater generation"; Journal of Materials Chemistry A, vol. 7, No. 42, Sep. 6, 2019, pp. 24092-24123.

Chen et al., "Challenges and Opportunities for Solar Evaporation"; Joule, vol. 3, No. 3, Mar. 20, 2019, pp. 683-718.

Jiang et al., "Multi-3D hierarchical biomass-based carbon particles absorber for solar desalination and thermoelectric power generator"; Journal of Materials Science & Technology, Allerton Press, Amsterdam, NL, vol. 59, Jun. 27, 2020, pp. 180-188.

Mu et al., "Strategies for breaking theoretical evaporation limitation in direct solar steam generation"; Solar Energy Materials and Solar Cells, Elsevier Science Publishers, Amsterdam, NL, vol. 220, Oct. 19, 2020.

Zhu et al., "Carbonized daikon for high efficient solar steam generation"; Solar Energy Materials and Solar Cells, vol. 191, Nov. 16, 2018, pp. 83-90.

International Search Report issued in International Patent Application No. PCT/EP2021/086420, dated Mar. 4, 2022 in 4 pages.

The Extended European Search Report issued in European Patent Application No. 20214979.5, dated Jun. 8, 2021 in 46 pages.

* cited by examiner

Carbonized compressed powder

Carbonized wood

Absorption spectra:
Carbonized wood vs Carbonized Compressed Powder

DESALINATION AND/OR PURIFICATION DEVICE, DESALINATION AND/OR PURIFICATION CARBON MEMBRANE, AND METHOD OF DESALINATING AND/OR PURIFYING A LIQUID

CROSS-REFERENCE TO RELATED APPLICATIONS

This application is the U.S. National Phase under 35. U.S.C. § 371 of International Application PCT/EP2021/086420, filed Dec. 17, 2021, which claims priority to European Patent Application No. 20214979.5, filed Dec. 17, 2020. The disclosures of the above-described applications are hereby incorporated by reference in their entirety.

TECHNICAL FIELD

The present disclosure relates to a desalination and/or purification device, a desalination and/or purification carbon membrane, and a method of desalinating and/or purifying a liquid by using the desalination and/or purification device.

BACKGROUND

In general, purification of a liquid is understood as the reduction and/or removal of undesirable chemicals, biological contaminants, suspended and/or dissolved solids, and/or gases from a liquid with an intention of producing a purified liquid where undesirable chemicals, biological contaminants, suspended and/or dissolved solids, and/or gases are reduced and/or removed from the liquid when compared to its purified form. For example, water is usually subjected to purification so as to provide water suitable for human consumption, such as drinking water and/or water used for washing the human body. In other examples, purification of a liquid, such as water, may be carried out for medical, pharmacological, chemical, and/or industrial applications. There are many different processes on the basis of which a liquid may be purified, such as physical process in form of filtration, sedimentation, evaporation, and/or distillation, biological processes in form of slow sand filters or filters or biologically active carbon, chemical processes in form of flocculation and chlorination, and/or the use of electromagnetic radiation such as ultraviolet light for disinfecting the liquid. As a result of purification, the concentration of particulate matter including suspended and/or dissolved particles, parasites, bacteria, algae, viruses, and fungi in a liquid may be reduced, as well as the concentration of a range of dissolved and particulate matter may be reduced.

An ongoing issue in the present world is scarcity of water in some regions, although around two-thirds of the surface of the earth is covered with water, because only 2.5% of this water is freshwater and just 0.3% is fit for human consumption. The remaining water, which we find in oceans and seas, is not potable due to its salinity level. In many parts of the world, freshwater is in short supply despite the planet having plenty of water. As the saltwater present in oceans and seas makes up to 97.5% of the water of the planet, efforts have been made since the 17th century to convert saltwater into drinking water. For example, Sir Francis Bacon attempted to desalinate seawater bypassing the flow through a sand filter, thereby implementing a physical purification process with the concrete application to desalinating seawater. Although his experiment did not succeed, it marked the beginning of a new interest in the field, which persists until today. In the year 2003 for example, 25 million cubic meters of seawater were desalinated every day. Although 70% of the world's population lives on the sea coast, only 0.25% of the entire freshwater supply is generated by desalination which therefore represents an important but not exclusive example of purification of a liquid.

Currently, a great part of desalination facilities are powered by fossil power. Aside from being problematic concerning the environment, these kinds of desalination facilities are expensive and not available at small scales or in regions with an insufficiently developed infrastructure.

Desalination and renewable energies, particularly wind energy, thermal and electrical solar energy work together very well. Often, desalination is requested at places that have a sufficient amount of solar energy available. Particularly, such facilities are suitable in decentralized operations in areas with weak infrastructure because areas with well-developed infrastructure usually provide sufficient conventional energy for desalination, where the amount of water demanded per person is at the same time greater than 10 liters a day. By contrast, in areas that have weakly developed infrastructure, power supply based on renewable energies is more reliable than the supply of power generated by conventional energy sources and persons living in small communities of developing countries usually need less than 10 liters of potable water a day.

It is, therefore, necessary to develop cost-efficient devices not only for desalination of liquid but also for purification of liquid, which relies on renewable energy sources and which can produce a high rate of desalinated or generally purified liquid per day.

BRIEF SUMMARY

The above objective is solved by a desalination and/or purification device in accordance with independent claim 1. Further advantageous embodiments are defined in dependent claims 2 to 10. Independent claim 11 defines a method of desalinating and/or purifying a liquid by using the desalination and/or purification device of one of claims 1 to 10. Claim 12 defines a desalination and/or purification carbon membrane, while advantageous embodiments thereof are defined in the dependent claims 13 to 17.

In the following, desalination is understood as indicating removal of at least some of mineral and/or salt components of a liquid, such as a saline liquid, while purification is generally understood as an at least partial removal of undesirable chemicals and/or biological contaminants and/or suspended solids and/or gases from a liquid with an intention of producing a purified liquid where at least some of undesirable chemicals and/or biological contaminants and/or suspended solids and/or gases are removed from the liquid when compared to its purified form. It is further understood that desalination and/or purification as referred to in the following, does not mean that a desalinated and/or purified liquid complies with any legal norm or legal requirement. Instead, it is understood that a desalinated and/or purified liquid as obtained in the various aspects and illustrative embodiments of the present disclosure by a desalination and/or purification device and/or in accordance with a method of desalinating and/or purifying a liquid and/or as obtained via a desalination and/or purification carbon membrane, may be desalinated and/or purified to any desired degree of desalination and/or purification.

In a first aspect of the present invention, a desalination and/or purification device is provided, the desalination and/or purification device comprising a membrane comprising a carbon membrane body which is at least partially formed of carbon. The carbon membrane body comprises a carbon surface and a structure of microchannels and/or nanochannels at least partially permeating the carbon membrane body and ending at openings at the carbon surface. The carbon membrane body further comprises a liquid transportation structure extending at least partially through the carbon membrane body without being exposed at the carbon surface. Herein, the carbon surface is exposed to electromagnetic radiation and the carbon surface serves as a heat absorption surface of the carbon membrane body without being affected by the liquid transport structure (heat absorption surface means that the carbon surface receives a maximum quantity of electromagnetic radiation, e.g. solar radiation, per unit area during a relatively long time interval when compared to other surfaces of the carbon membrane body during its use). For example, the carbon surface may be a surface of the carbon membrane body having maximum dimensions along two mutually perpendicular directions in the surface when compared to other surfaces, and being exposed to radiation during use of the carbon membrane body. Accordingly, the carbon surface of the membrane body is not impaired by the presence of the liquid transportation structure. In illustrative examples herein, the liquid transportation structure may be arranged and configured to supply the structure of microchannels and/or nanochannels of the carbon membrane body with liquid to be desalinated and/or purified.

The desalination and/or purification device further comprises a condenser arranged above the carbon membrane body. For example, the carbon membrane body may contain at least 50% carbon, such as at least 60% carbon or at least 70% carbon or at least 80% carbon or at least 90% carbon or at least 95% carbon or at least 99% carbon.

The desalination and/or purification device in accordance with this aspect allows a solar steam generation of desalinated and/or purified liquid which may be employed for exploiting solar energy for purification and/or desalination purposes in an effective way. The carbon membrane body is formed of carbon as an inexpensive material and may be easily produced and manipulated. The carbon surface of the carbon membrane body provides high values of light absorption such that it may work well as a light-harvesting body. The carbon membrane body, therefore, effectively functions as an inexpensive volumetric water transportation system in the desalination and/or purification device.

In illustrative examples of the carbon membrane body of the first aspect, the structure of microchannels and/or nanochannels may be an at least two-level disordered structure or network of channels such that the carbon membrane body is an isotropic homogeneous network of disordered microchannels and/or nanochannels constituted by interconnected pores. Herein, an at least two-level disordered structure may be understood as a structure that possesses at least two different scales of disordered properties, in which the constituent factors that quantify the disorder, change sharply between these scales while being defined within specific ranges in the same scale. As a measure of disorder at each scale, the following quantities may be considered in special illustrative but non-limiting examples: mean pore size, mean pore distance, mean number of pores per unit volume. Accordingly, microchannels and nanochannels originating from the correspondent size pores may be connected so as to efficiently transport water around the volume structure as a water piping system does in a building: the microchannels act like main pipes from which peripherical pipes originate (that is, nanochannels). Due to the isotropic homogenous network of disordered microchannels and nanochannels, nanopores are randomly distributed on the surface of the microchannels, constituting the openings for the nanochannels that spread in every direction, intercrossing other micro/nanochannels and shaping the highly interconnected disordered structure.

For example, a grade of disorder may be determined by an adsorbance determined with a Brunauer-Emmett-Teller (BET) model (with liquid absorbance instead of gas absorbance) and/or a chord length distribution and/or a mean chord length of pores and/or a pore surface area and/or a skeletal density, where the skeletal density may be given by the mass of a solid divided by the volume of the solid excluding open and closed pores. In accordance with some illustrative examples herein, measurements on the basis of small-angle x-ray scattering (SAXS) may be performed in order to determine a chord length distribution and/or a mean chord length of pores and/or a pore surface area of the membrane body.

In some special illustrative embodiments herein, the structure of microchannels and/or nanochannels may have a porosity in a range from about 10% to about 50%, preferably in a range from about 20% to about 40% or from about 20% to about 35% or from about 20% to about 30%, and more preferably in a range from about 25% to about 28%.

In some special illustrative embodiments, the structure of microchannels and/or nanochannels may represent a two-level disordered structure having pores which represent openings of at least some of the microchannels and/or nanochannels at surfaces and/or interfaces of the carbon membrane body with substantially two scales of pore sizes, wherein a first set of pores has mean radii of less than 1000 nm, preferably in a range from about 10 nm to about 900 nm, e.g., in a range from about 10 nm to about 700 nm or in a range from about 50 nm to about 500 nm, and more preferably in a range from about 100 to about 300 nm, while a second set of pores has mean radii of more than 1 μm, preferably in a range from about 1.1 μm to about 20 μm, e.g., in a range from about 1.5 μm to about 15 μm or in a range from about 1.5 μm to about 10 μm, and more preferably in a range from about 2.0 μm to about 10 μm such as in a range from about 2.0 μm to about 5 μm or 2.4 μm to about 5.0 μm. In some special examples herein, a density of pores in the first set of pores may be in a range from about 102 pores/mm2 to about 104 pores/mm2, preferably in a range from about 10×103 pores/mm2 to about 900×103 pores/mm2, such as 50×103 pores/mm2 to about 500×103 pores/mm2, and more preferably in a range from about 100×103 pores/mm2 to about 300×103 pores/mm2, such as in a range from about 150×103 pores/mm2 to about 200×103 pores/mm2, e.g., about 153×103 pores/mm2. In some special examples herein, a density of pores in the second set of pores may be in a range from about 102 pores/mm2 to about 104 pores/mm2, preferably in a range from about 102 pores/mm2 to about 104 pores/mm2, such as 500×102 pores/mm2 to about 500×104 pores/mm2, and more preferably of about 103 pores/mm2. In some special illustrative and non-limiting examples, the mean radii of pores and/or a density of pores may be determined by optically evaluating channel and/or pore sizes in optical images of carbon membrane bodies, such as images obtained by SEM, TEM, and/or SAXS. Additionally or alternatively, porosimetry may be used for determining various quantifiable aspects of a material's porous structure, such as pore diameter, total pore volume, surface area, and bulk and absolute densities, where porosity is known in the art as an analytical technique involving the intrusion of a non-wetting liquid (often mercury) at high pressure into a material through the use of a porosimeter such that pore sizes can be determined based on the external pressure needed to force the liquid into a pore against the opposing force of the liquid's surface tension.

In various illustrative embodiments of the first aspect, a two-level disordered structure may represent a three-dimensional hierarchically disordered network of channels in the carbon membrane body, indicating that the channels in such a structure of microchannels and/or nanochannels are substantially isotropically distributed in every direction. In accordance with some special but non-limiting examples herein, it may be understood that a number of pores at each surface of the carbon membrane body is greater than a number of channels extending within the carbon membrane body, wherein each channel considered is an open channel (i.e., not a blind channel).

In accordance with some embodiments of the first aspect, the carbon membrane body may be substantially completely or completely formed of one material, such as carbon and/or the purification device may be configured to float on the liquid to be desalinated and/or purified. An accordingly provided carbon membrane body may be easily produced and manipulated such that the carbon membrane body may be provided in an easy and cost-efficient manner, and/or the carbon membrane body may be used in floating applications such that the desalination and/or purification device may be embodied as a mobile device, for example. In the case of the carbon membrane body being substantially formed of carbon, it may be provided in a cost-efficient way, as carbon is an inexpensive material. Furthermore, carbon allows a broadband light absorption, thereby increasing the efficiency of solar-thermal heat generation. In accordance with some illustrative examples, the carbon membrane body may be formed of compressed charcoal powder or made of compressed coal powder, e.g., by compressing carbon powder into a stable floating membrane, or compressed carbonized material, such as carbonized wood.

In accordance with some embodiments of the first aspect, the liquid transportation structure may comprise at least one capillary element configured to draw liquid from a reservoir or a source of liquid providing the liquid to be desalinated and/or purified to the carbon membrane body by capillary forces. Such a liquid transportation structure may be easily washed, whereby a buildup of removed components from the liquid to be desalinated and/or purified, such as salt in desalination applications, can be efficiently eliminated in an easy way. Furthermore, the capillary element may be implemented in such a way that an appropriate amount of liquid may be drawn from the reservoir and supplied to the carbon membrane body per time to achieve a very efficient operation of the purification and/or desalination device. In an illustrative example herein, the capillary element may comprise a wick element, such as braided cotton, cotton fibers, hydrophilic textile fibers, a mesh of fibers, and the like. These examples may represent cost-efficient examples for such capillary elements. In accordance with another illustrative example herein, at least one capillary element may be partially encapsulated at one end by the carbon membrane body and may be in communication with the structure of microchannels and/or nanochannels. For example, the liquid transport structure may comprise a plurality of capillary elements which extend in at least one plane which is substantially parallel to the carbon surface of the carbon membrane body within the carbon membrane body. Accordingly, a reliable supply of liquid drawn by the capillary element to the carbon membrane body may be realized.

In accordance with some embodiments of the first aspect, the desalination and/or purification device may further comprise a thermal insulator arranged between the carbon membrane body and the liquid to be desalinated and/or purified which may be provided by a reservoir or a source. The thermal insulator may serve for thermal insulation between the carbon membrane body and the liquid to be desalinated and/or purified. It is thereby avoiding that generated heat diffuses to bulk water and environment such that heat losses are at least minimized. Accordingly, the heat generated by solar-thermal heat generation is used very efficiently for desalination and/or purification.

In some illustrative examples herein, the thermal insulator has at least one opening formed therein, the liquid transportation structure being guided through the at least one opening from in the thermal insulator from the carbon membrane body to the liquid to be desalinated and/or purified. Accordingly, an advantageous thermal insulation from the carbon membrane body against the reservoir despite of the presence of the liquid transportation structure.

In a second aspect of the present disclosure, a method of desalinating and/or purifying a liquid by using the desalination and/or purification device of the first aspect is provided, the method comprising: providing a liquid to be desalinated and/or purified to a transportation structure, exposing the carbon surface of the carbon membrane body to radiation energy, and collecting condensate generated by the condenser in a condensate collector. In some illustrative examples herein, the liquid to be desalinated and/or purified may be provided by filling a reservoir with the liquid and bringing the liquid transportation structure into communication with the liquid-filled into the reservoir, or providing a source of the liquid to be desalinated and/or purified and bringing the liquid of the source and the liquid transportation structure into communication.

In a third aspect, a desalination and/or purification carbon membrane is provided, the desalination and/or purification carbon membrane comprising a carbon membrane body and a carbon surface, wherein the carbon membrane body has a structure of microchannels and/or nanochannels. The carbon membrane body has at least one hole formed therein at least partially extending through the carbon membrane body, the at least one hole not being formed in the carbon surface, thereby not impairing an integrity of the carbon surface. For example, the carbon membrane body may contain at least 50% carbon, such as at least 60% carbon or at least 70% carbon or at least 80% carbon or at least 90% carbon or at least 95% carbon or at least 99% carbon. In some illustrative examples herein, the structure of microchannels and/or nanochannels of the carbon membrane body may be a three-dimensional hierarchically disordered network of channels.

In accordance with some illustrative embodiments of the third aspect, the carbon membrane body may be substantially/completely formed of one material and/or the desalination and/or purification carbon membrane may further comprise a liquid transportation structure extending at least partially through the carbon membrane body, the liquid transportation structure being arranged and configured to supply the structure of microchannels and/or nanochannels of the carbon membrane body with a liquid to be desalinated and/or purified. In accordance with some illustrative examples, the carbon membrane body may be formed of carbon, such as charcoal or compressed coal powder, in which case the carbon membrane body may be provided in a cost-efficient way because carbon is an inexpensive material that may be easily worked on. Additionally or alternatively, the desalination and/or purification carbon membrane may be provided with a liquid transportation structure which, in turn, may comprise at least one capillary element configured to draw liquid from a reservoir or a source of liquid providing the liquid to be desalinated and/or purified to the carbon membrane body by capillary forces, where such a liquid transportation structure may be easily washed and a buildup of removed components from the liquid to be desalinated and/or purified, such as salt in desalination applications, can be efficiently eliminated in an easy way. In some examples herein, the capillary element may be implemented in such a way that an appropriate amount of liquid may be drawn from the reservoir and supplied to the carbon membrane body per time to achieve a very efficient operation of the purification and/or desalination device. For example, the capillary element may comprise a wick element, such as braided cotton, cotton fibers, hydrophilic textile fibers, a mesh of fibers, and the like, where these examples represent cost-efficient examples for such capillary elements, and/or at least one capillary element may be partially encapsulated at one end by the carbon membrane body and may be in communication with the structure of microchannels and/or nanochannels. For example, the liquid transport structure may comprise a plurality of capillary elements which extend in at least one plane which is substantially parallel to the carbon surface of the carbon membrane body within the carbon membrane body. Accordingly, a reliable supply of liquid drawn by the capillary element to the carbon membrane body may be realized.

In accordance with some illustrative embodiments of the third aspect, the carbon membrane body may have at least one hole formed therein, the hole extending through the carbon membrane body along a direction that is substantially different from a direction normal to the carbon surface. Accordingly, the desalination and/or purification carbon membrane may either have a liquid transportation structure provided therein via the at least one hole the carbon membrane body may allow that a liquid transportation structure is provided in the desalination and/or purification carbon membrane via the at least one hole. In accordance with some illustrative examples herein, the carbon membrane body may have at least two rows of holes formed therein, each row comprising at least two holes arranged in a plane, which is substantially parallel to the carbon surface. Thereby an advantageous arrangement of the liquid transportation structure may be realized, the liquid transportation structure permeating the carbon membrane body in a mesh-like manner. Accordingly, a larger diffusion of water inside the volume of the carbon membrane body is achieved.

In accordance with some illustrative embodiments of the first aspect, the desalination and/or purification device of the first aspect may be provided in that the carbon membrane body is provided by the desalination and/or purification carbon membrane of the third aspect.

Accordingly, an advantageous combination of the first and third aspects of the present disclosure may be implemented.

BRIEF DESCRIPTION OF THE DRAWINGS

Further advantages and illustrative embodiments of the present disclosure will be apparent from the following detailed description which is presented with regard to the enclosed drawings, where the drawings show.

Figure 1:
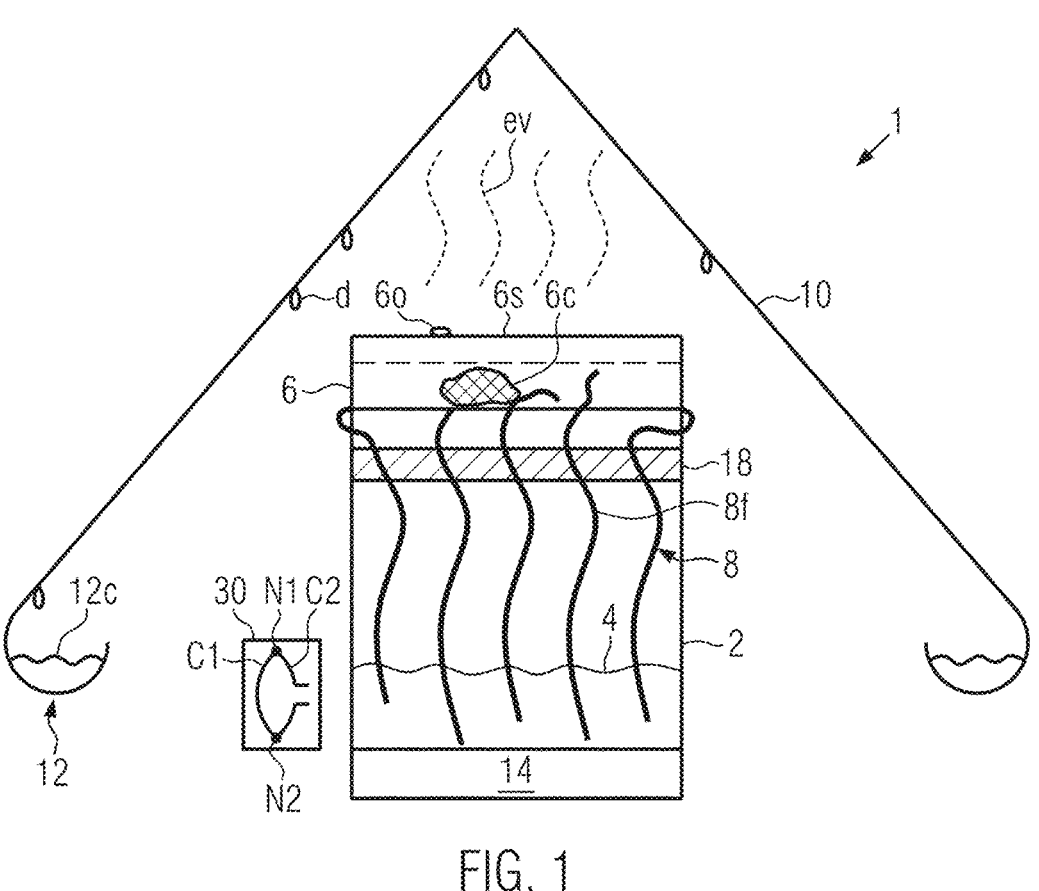
FIG. 1 shows a schematic illustration of a desalination device as an example of a purification device in accordance with some illustrative embodiments of the present disclosure.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

A desalination device in accordance with some illustrative embodiments of the present disclosure will now be described in greater detail with regard to FIG. 1 which shows a desalination device 1.

The desalination device 1 comprises a reservoir 2 for accommodating a liquid 4 to be subjected to a desalination process, a membrane comprising a carbon membrane body 6 which is at least partially formed of carbon. For example, the carbon membrane body 6 may be substantially/completely formed of a compressed carbon material. For example, the carbon membrane body 6 may be made of compressed charcoal powder or compressed coal powder. In any case, the carbon membrane body comprises a carbon surface 6s and a structure 6c of microchannels and/or nanochannels which at least partially permeates the carbon membrane body 6 and ends at openings 6o formed at the carbon surface 6s for exposure to electromagnetic radiation. Accordingly, liquid 4 transported via the structure 6c of microchannels and/or nanochannels through the carbon membrane body 6 is exposed at the carbon surface 6s by the openings 6o such that the entire carbon surface 6s functions as a transport surface, while it also serves as a heat absorption surface for being exposed to electromagnetic radiation. For example, the structure $6c$ of microchannels and/or nanochannels may be provided by a material body which has microchannels and/or nanochannels formed therein, e.g. a polyamide thin film composite material or a nanomaterial formed of carbon nanotubes, and the carbon surface $6s$ may be provided on a surface of the material body which provides the structure $6c$ of microchannels and/or nanochannels. As a result, the carbon membrane body 6 may be formed in an inexpensive way and may be produced at any scale.

In the various embodiments of the present disclosure, the structure $6c$ of microchannels and/or nanochannels is an at least two-level disordered structure or network of channels. Herein, a two-level disordered structure may be understood as a structure that possesses at least two different scales of disordered properties, in which the constituent factors that quantify the disorder, change sharply between these scales while being defined within specific ranges in the same scale. As a measure of disorder at each scale, the following quantities may be considered in special illustrative but non-limiting examples: mean pore size, mean pore distance, mean number of pores per unit volume. Accordingly, microchannels and nanochannels originating from the correspondent size pores may be connected so as to efficiently transport water throughout the carbon membrane body 6. Due to the isotropic homogenous network of disordered microchannels and/or nanochannels, which are isotropic and randomly distributed in the carbon membrane body 6, micropores and/or nanopores result in the surface $6s$ of the microchannels, constituting the openings $6o$ distributed randomly in the surface $6s$ of the carbon membrane body 6 because microchannels and nanochannels spread in every direction within the carbon membrane body 6, wherein macrochannels and nanochannels intercross other microchannels and nanochannels, thereby shaping a highly interconnected disordered structure as the structure $6c$ in the carbon membrane body 6.

In accordance with some special illustrative but non-limiting example, the structure $6c$ of microchannels and/or nanochannels may be a two-level structure of microchannels and nanochannels having pores which represent openings of at least some of the microchannels and/or nanochannels at surfaces and/or interfaces of the carbon membrane body. The microchannels and nanochannels represent substantially two scales of pore sizes, wherein a first set of pores has radii of less than 1000 nm, preferably in a range from about 10 nm to about 900 nm, e.g., in a range from about 10 nm to about 700 nm or in a range from about 50 nm to about 500 nm, and more preferably in a range from about 100 to about 300 nm, while a second set of pores has radii of more than 1 μm, preferably in a range from about 1.1 μm to about 20 μm, e.g., in a range from about 1.5 μm to about 15 μm or in a range from about 1.5 μm to about 10 μm, and more preferably in a range from about 2.0 μm to about 10 μm such as in a range from about 2.0 μm to about 5 μm or 2.4 μm to about 5.0 μm. In some special examples herein, a density of pores in the first set of pores may be in a range from about $10^2$ pores/$mm^2$ to about $10^4$ pores/$mm^2$, preferably in a range from about $10 \times 10^3$ pores/$mm^2$ to about $900 \times 10^3$ pores/$mm^2$, such as $50 \times 10^3$ pores/$mm^2$ to about $500 \times 10^3$ pores/$mm^2$, and more preferably in a range from about $100 \times 10^3$ pores/$mm^2$ to about $300 \times 10^3$ pores/$mm^2$, such as in a range from about $150 \times 10^3$ pores/$mm^2$ to about $200 \times 10^3$ pores/$mm^2$, e.g., about $153 \times 10^3$ pores/$mm^2$. In some special examples herein, a density of pores in the second set of pores may be in a range from about $10^2$ pores/$mm^2$ to about $10^4$ pores/$mm^2$, preferably in a range from about $10^2$ pores/$mm^2$ to about $10^4$ pores/$mm^2$, such as $500 \times 10^2$ pores/$mm^2$ to about $500 \times 10^4$ pores/$mm^2$, and more preferably of about $10^3$ pores/$mm^2$.

In accordance with some illustrative embodiments herein, the carbon membrane body 6 may comprise charcoal representing an advantageous material to be used in solar steam generation systems because of its light-absorbing properties, its abundant availability, and low cost. Different kinds of charcoal can be found in nature or can be obtained artificially starting from a wide variety of wood types. Charcoal may be easily manipulated in order to alter its characteristic porosity and light-absorbing properties when, starting from a piece of carbonized organic material or fossil charcoal, powdering the piece of carbonized organic material, e.g., by means of a standard industrial blending machine, and then compressing the obtained powder to obtain the desired solid shape by using a compactor, thereby obtaining a carbonized compressed powder (CCP).

In accordance with some illustrative embodiments, in which the carbon membrane body 6 is completely made of carbon material, the complex porous nature of carbon material constitutes the structure $6c$ of microchannels and nanochannels. For example, the ability of charcoal to retain water is attributed to its porosity. In a special illustrative example herein, the adsorption of activated carbon is employed, wherein the activated carbon is a carbonaceous and highly porous adsorption medium with a complex structure consisting mainly of carbon atoms. Activated carbon pore networks are channels that are created within a rigid framework of disordered layers of carbon atoms that are bonded together and unevenly stacked by chemical bonds to create a highly porous structure of niches, cracks, and gaps between the layers of carbon atoms. During the process of compressing powder of activated carbon, it is very important to adapt the molecule to be adsorbed to the pore size of the activated carbon. These molecules are then trapped by van der Waals forces or other attractive forces in the internal pore structure of the carbon and accumulate on a solid surface. In summa, adsorption is the adhesion or attachment of atoms, ions, and molecules (adsorbates) from a gaseous, liquid, or soluble medium to the surface of an adsorbent-activated carbon. The porosity of activated carbons provides a large surface on which this adsorption can take place. The adsorption occurs in pores that are slightly larger than the molecules to be adsorbed. Therefore, the key properties of activated carbon are: Surface Area, Total Pore Volume, Pore Radius. Regarding the Surface Area, the higher the surface area the higher the effectiveness of the carbon. As for the Pore Radius, the best carbons have a higher distribution of mesopores. As for the Pore Volume, for most of the pore volume to be utilized, the sizes of the molecules to be adsorbed shall be a good match to the pore size. An illustrative porosity of a carbon membrane body 6 in accordance with illustrative examples is in a range from about 10% to about 60%, e.g., at about 30%. Herein, the porosity may represent a volume of pores in a body compared to a total volume of the body. For example, porosity may be determined by measuring an initial weight and a final weight of the sample when the sample becomes completely saturated with liquid. From the initial weight and the final weight, the porosity may be determined. Alternatively, SEM images at different magnifications of a carbon membrane body 6 may be obtained and the SEM images may be evaluated for determining a porosity in accordance with known techniques.

In general and as the reflectivity spectra of charcoal show, charcoal is a strong light absorber across a wide range of wavelengths, ranging from 400 nm to 800 nm, reaching up to 97%. Accordingly, charcoal may be advantageously employed due to solar-powered desalination.

Referring to FIG. 1, the desalination device 1 further comprises a liquid transportation structure 8 extending between the reservoir 2 and the carbon membrane body 6 without being exposed at the carbon surface 6s. The liquid transportation structure 8 is arranged and configured to supply the structure 6c of microchannels and/or nanochannels of the carbon membrane body 6 with liquid from reservoir 2. In some illustrative examples herein, the liquid transportation structure 8 may comprise at least one capillary element 8f configured to draw liquid from the reservoir 2 to the carbon membrane body 6 by capillary forces. As an example, without limitation, the at least one capillary element may be formed by at least one wick element such as an element formed by braided cotton, cotton fibers, hydrophilic textile fibers, and a mesh of such fibers. As a result, the liquid transportation structure 8 may be formed in an inexpensive way and may be produced at any scale.

With regard to the desalination device 1 as shown in FIG. 1, the at least one capillary element 8f may be partially encapsulated by the carbon membrane body 6 such that at least one end of the capillary element is arranged in the carbon membrane body 6 may be in communication with the structure 6o of microchannels and/or nanochannels. As an illustrative example, the at least one capillary element may be immersed in the liquid 4 at the other end, while the one end of the capillary element 8f extends through the carbon membrane body 6 to the structure 6c of microchannels and/or nanochannels. Alternatively, both ends of the at least one capillary element 8f may be immersed in the liquid 4 while the at least one capillary element 8f is encapsulated by the carbon membrane body 6 at a central region of the at least one capillary element 8f. With regard to illustrative embodiments in which the carbon membrane body 6 is made of compressed coal powder, the at least one capillary element 8f may be pressed into the carbon membrane body 6 when pressing the coal powder during a fabrication process of the carbon membrane body 6. Additionally or alternatively, holes designed to accommodate the liquid transportation structure 8 (e.g., capillary elements 8f such as cotton fibers, etc.) may be manufactured by using a CNC (computer numerical control) facility for drilling appropriate holes into the carbon membrane body 6. For example, holes may be made which extend through the carbon membrane body 6 at different height levels relative to a lower surface of the carbon membrane body (a surface facing towards the reservoir in FIG. 1) at perpendicular directions with respect to each other, whereby a larger diffusion of liquid inside the carbon membrane body 6 is achieved. For example, there may be at least two rows of holes, each row of holes comprising at least two holes.

Furthermore, the desalination device 1 comprises a condenser 10 arranged above the carbon membrane body 6. In some illustrative examples, the desalination device 1 may further comprise a condensate collector 12 in communication with the condenser 10 for collecting condensate 12c generated at the condenser 10 and/or output means, such as a tap or a drain tube, etc.

Details of the carbon membrane body will be described with regards to FIGS. 2a and 2b, in which a desalination system is schematically illustrated, the depicted desalination system being similar to the desalination device 1 of FIG. 1, wherein similar and/or equal elements between FIG. 1 on the one hand and FIGS. 2a and 2b on the other hand are denoted by equal reference numerals.

Figures 2A, 2B:
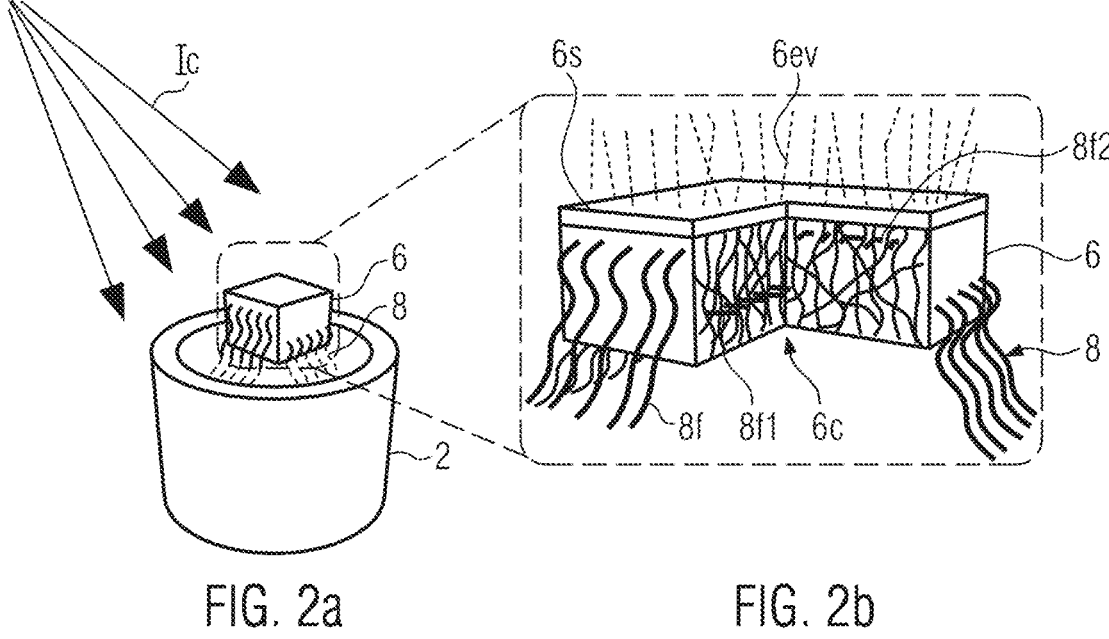
FIGS. 2a and 2b show a schematic illustration of a desalination device as an example of a purification device with an enlarged sectional view together with a carbon membrane body in accordance with illustrative embodiments of the present disclosure.

As depicted in FIGS. 2a and 2b, the illustrated desalination system comprises a desalination membrane, a liquid transportation structure 8, and a reservoir 2, wherein it is referred to the corresponding description of these elements as provided in the context of FIG. 1 above. The membrane comprises a carbon membrane body 6 with a carbon surface 6s.

With regard to the enlarged view of FIG. 2a, the sectional view of the carbon membrane body 6 shows that the liquid transportation structure 8 may be formed in accordance with some illustrative examples by a plurality of fibers 8f which comprise fibers 8f1 arranged in a first row at a first height level relative to a lower surface of the carbon membrane body 6 (i.e. a surface of the carbon membrane body 6 facing towards the reservoir 2 in FIG. 2a) and fibers 8f2 arranged in a second row at a second height level relative to the lower surface of the carbon membrane body 6. The first height level may be lower than the second height level. Although FIG. 2b shows two rows of fibers, this is not limiting and there may be an arbitrary number of rows, e.g., only one row, three rows, four rows, etc. As illustrated in FIG. 2b, the fibers 8f1 in the first row may be arranged within the carbon membrane body such that the fibers 8f1 extend in a plane that is parallel to the lower surface of the carbon membrane body 6 and the fibers 8f2 may be arranged within the carbon membrane body such that the fibers 8f1 extend in a plane that is parallel to the lower surface of the carbon membrane body 6. In general, in the case of more than one row, the rows may extend in planes parallel to the lower surface of the carbon membrane body 6. In accordance with some illustrative examples, as illustrated in FIG. 2b, the fibers in two successive rows may extend perpendicular to each other such that a mesh structure is provided.

Referring to FIG. 2a, a setup of the desalination device as used by the inventors in actual experiments comprising a desalination membrane is shown in a schematic way. However, for the sake of a clear illustration, condensing elements, such as the condenser 10, and the condensate collector 12 in FIG. 1 are not depicted in FIG. 2a. FIG. 2b shows in an enlarged view a section of the desalination membrane depicted in FIG. 2a the carbon membrane body 6 of FIG. 2a.

In accordance with some illustrative embodiments, the desalination membrane depicted in FIGS. 2a and 2b comprises a carbon membrane body 6 which is exposed to radiation energy in the form of irradiation Ic provided by a source such as the sun or a source emitting light resembling solar radiation. The carbon membrane body 6 has a structure 6c of microchannels and/or nanochannels, and a carbon surface 6s. Due to the structure 6c of microchannels and/or nanochannels, the desalination membrane acts as an absorber structure. Furthermore, the carbon surface 6s absorbs light by which the carbon membrane body 6 is irradiated. In accordance with some illustrative embodiments, the carbon membrane body 6 may be substantially completely formed of one material, such as carbon, e.g., the carbon membrane body 6 may be formed of compressed charcoal powder or made of compressed coal powder.

Furthermore, the carbon membrane body 6 has a liquid absorbing system encapsulated therein by means of the liquid transportation structure 8, which extends through the carbon membrane body 6 as indicated in the enlarged view of FIG. 2b. Herein, liquid drawn by the liquid transportation structure 8 into the carbon membrane body 6, enters the structure 6c of microchannels and/or nanochannels formed in the carbon membrane body 6. The liquid drawn from the reservoir 2 by the liquid transportation structure 8 into the carbon membrane body 6 permeates the carbon membrane body 6 and reaches openings 6*o* provided at the carbon surface 6*s* of the carbon membrane body 6 by capillary forces caused by the liquid transportation structure 8 and the structure 6*c* of microchannels and/or nanochannels. In other words, liquid is drawn by capillary forces via the liquid transportation structure 8 to the carbon membrane body 6 and moves via the structure 6*c* of microchannels and/or nanochannels towards the openings 6*o* at the carbon surface 6*s*. Liquid, which reaches the opening 6*o*, appears at the carbon surface 6*s* where the liquid evaporates due to a heating of the carbon surface 6*s* when absorbing light during operation.

The liquid transportation structure 8 may be attached to the carbon membrane body 6 bay means of holes formed in the carbon membrane body 6. In accordance with some illustrative embodiments, the carbon membrane body may have at least one hole formed therein, the hole extending through the carbon membrane body 6 along a direction that is substantially different from a direction normal to the lower surface of the carbon membrane body 6. For example, the carbon membrane body 6 may have at least two rows of holes formed therein, each row comprising at least two holes arranged in a plane, which is substantially parallel to the carbon surface. In accordance with some special illustrative examples and as illustrated in FIG. 2*b*, holes may be made which extend through the carbon membrane body 6 at different height levels relative to a lower surface of the carbon membrane body (a surface facing towards the reservoir in FIG. 2*b*) at perpendicular directions with respect to each other, whereby a larger diffusion of liquid inside the carbon membrane body 6 is achieved due to a mesh-like arrangement of holes. For example, there may be at least two rows of holes, each row of holes comprising at least two holes.

Referring back to FIG. 1, the liquid drawn to the carbon surface 6*s* of the carbon membrane body 6 evaporates as indicated by reference numeral ev in FIG. 1 and condenses at the condenser 10 which is arranged above the carbon membrane body 6. As indicated by reference numeral d in FIG. 1, the condensed liquid drops down the condenser 10 and is collected at the condensate collector 12 which collects the condensate 12*c* generated by the condenser 10.

In accordance with some illustrative embodiments, the condenser 10 may be provided by an optical transparent element such as a plate of glass or plastic, which is optically transparent in a frequency band of the radiation energy by which the carbon membrane body 6 is irradiated. Preferably, the condenser is substantially transparent at a frequency at which the carbon surface 6*s* is absorptive to more than 50%, preferably more than 80%, and more preferably more than 90%. Additionally or alternatively, the condenser 10 may be actively cooled. In case that the condenser 10 is provided by at least one plate-shaped element, the condenser may be slanted with respect to a ground on which the desalination device 1 is arranged, or the condenser 10 may be provided in form of a roof above the carbon membrane body 6. Although a plate-shaped element has the advantage of providing a relatively high condensing surface when compared to elements of other shapes, such as tubes, the shape of the condenser 10 is not particularly limited. In some special illustrative examples, a condensing surface of the condenser 10 may be hydrophobic to allow drops of condensed liquid to easily run towards the condensate collector 12 where the condensate 12*c* is collected.

In accordance with some illustrative embodiments, the desalination device 1 may comprise an optic (not illustrated)

by means of which sunlight may be directed and/or focused towards the membrane, e.g., by directing and focusing the sunlight towards the carbon membrane body 6, such as its carbon surface 6*s*. The optics (not illustrated) may comprise at least one of one or more optical waveguides, one or more mirrors, one or more lenses, etc.

In accordance with some illustrative embodiments of the present disclosure, the carbon surface 6*s* may be provided by a carbon layer formed on a body portion of the carbon membrane body 6 as indicated via the broken line in FIG. 1. The body portion of the carbon membrane body 6 may, in such an example, be provided by a suitable material that has the structure 6*c* of microchannels and/or nanochannels formed therein. Alternatively, the whole membrane may be formed as an integral body.

In accordance with some illustrative embodiments, the carbon membrane body 6 may be substantially completely formed of one material, such as carbon, e.g., the carbon membrane body 6 may be formed of charcoal or made of compressed coal powder.

With reference to FIG. 1, the carbon membrane body 6 is arranged over the reservoir 2 and a thermal insulator 18 may be arranged between the carbon membrane body 6 and the reservoir 2. In accordance with some illustrative examples herein, the thermal insulator 18 may be provided by a Styrofoam layer which guarantees thermal isolation between the liquid 4 contained in the reservoir 2 and the carbon membrane body 6. The thermal insulator 18 is optional and may be omitted in some illustrative embodiments. In some explicit example, the thermal insulator 18 has at least one opening formed therein, the liquid transportation structure 8 being guided through the at least one opening from in the thermal insulator 18 from the carbon membrane body 6 to the liquid to be desalinated and/or purified.

The person skilled in the art will appreciate that the desalination device 1 in accordance with some illustrative embodiments does not comprise pieces of metal that are in contact with the liquid of the reservoir 2, thereby avoiding the problems caused by corrosion. Particularly, the reservoir 2 and the carbon membrane body 6 may be formed by a non-metallic material. Accordingly, corrosion of the reservoir 2 and the carbon membrane body 6 may be avoided.

Referring to FIG. 2*a*, the inventors probed the illustrated desalination system on a laboratory scale with a production rate of purified water of 2.2 $kg/m^2h$ under an illumination of a radiation source corresponding to the radiation of the sun at 1 $kW/m^2$. It is therefore expected that the desalination device 1 as described with regard to FIG. 1 can reach, in outdoor experiments, if properly scaled, up to 2.2 $kg/m^2h$ of freshwater generated, translating into 20 liters per day for each $m^2$ when assuming 10 hours of sunlight. As a non-public outdoor experiment, a 34×34 cm prototype of solar desalination and purification system was placed outside near the seashore. It exploited a 20×20 cm area made by compressed charcoal absorbers, interconnected by a network of cotton fibers. The extremities of the fibers were immersed in seawater collected directly from the Red Sea and stored in a central reservoir in the bottom part of the prototype. In this way, water was continuously provided to the absorbers for the whole duration of the experiment. Thermal insulation was achieved by using a Styrofoam slab that prevents the water from being in contact with the charcoals. During the operation, purified water condensed onto the wall of a truncated-pyramid shaped part of the prototype acting as a condenser and was collected in a ring-shaped reservoir along the border of the bottom part acting as a condensate collector. Outside temperature and sun intensity were monitored during the experiment, from 7 AM to 7 PM. The temperature range was between 28-C and 37-C, and the maximum was reached around 10 AM. The measured average solar heat flux was 0.5 kW m$^{-2}$ with a peak of solar intensity of 0.950 kW m$^{-2}$ at 12 PM. Analytical measurements were conducted with specific probes onto samples of Red Sea water and purified water from the outdoor experiment to attest the quality and the efficiency of the desalination process. It was obtained that salinity decreased by 99.4%, dropping from 41 ppt to 0.24 ppt, being in the correct range of values for fresh potable water (where salinity should be lower than 0.5 ppt). It was measured that the amount of Total Dissolved Solids (TDS) dramatically decreased from 42000 ppm to 355 ppm, in range with the standard values for freshwater (TDS<500 ppm). Finally, Red Sea water conductivity was measured and compared with purified water's, resulting in a reduction factor of 119, ranging from 50000 μS to 420 μS, where the acceptable values for potable water range from 150 μS to 500 μS.

The nature of the desalination device 1 described above makes this technology suitable to be coupled with a thermal electric generator (TEG) for the cogeneration of freshwater and electricity. Solar thermal electric generators (STEG) are devices in which the hot side of the TEG is kept at high temperatures by means of a solar absorber, while the cold side is connected to a heat sink. The heat flux from the hot side to the cold side generates an electrical current through the Seebeck effect when using a Peltier element and an additional generation of electricity matching the power needs of a variety of clean fuel generation devices such as photoelectrochemical devices (PEC) may be obtained. In accordance with some illustrative embodiments herein, a Peltier element may be provided as indicated by reference numeral 30 in FIG. 1. The Seebeck element 30 in FIG. 1 may be formed by two different electrical conductors C1 and C2, such as iron and copper as non-limiting examples, which are coupled in a thermocouple at nodes N1 and N2. The carbon membrane body 6 may be thermally coupled to the Seebeck element 30 such that the carbon membrane body 6 (when heated by irradiation) acting as a heat source, is thermally coupled to one of the nodes N1 and N2. Then, according to the Seebeck effect, a potential difference occurs between the nodes N1 and N2, and an electrical current may be taped off.

Although the carbon membrane body 6 is schematically illustrated in FIG. 2*a* as a block-shaped body, this does not pose any limitation and the carbon membrane body 6 may be formed in any other form, e.g., in cylindrical form or any other appropriate form.

In a method of desalinating the liquid 4 in FIG. 1 by using the desalination device 1, the reservoir 2 is filled with the liquid 4 to be desalinated, such as seawater. Then, the liquid transportation structure 8 is brought into communication with the liquid 4 filled into the reservoir 2 and the carbon surface 6*s* of the carbon membrane body 6 is exposed to radiation energy emitted by a light source. The condensate 12*c* generated by the condenser 10 is collected in the condensate collector 12.

In accordance with some illustrative embodiments of the present disclosure, the carbon membrane body 6 of FIGS. 1 and 2*a* may not be in direct contact with the liquid in the reservoir 2, thereby achieving thermal insulation and a more efficient evaporation.

Regarding the carbon membrane body as described with regard to FIG. 1 and FIGS. 2*a* and 2*b* above, the carbon membrane body may be rinsed for removing any salt crystals present in the desalination membrane and to remove salt crystals from the liquid transportation structure. Accordingly, the carbon membrane body may be used repeatedly, thereby saving resources and being cost-efficient.

In the embodiments described above in the context of FIGS. 1 and 2, the liquid 4 is provided in a reservoir 2. However, this does not pose any limitation to the present disclosure and the liquid 4 may be provided by a source (not illustrated) of the liquid. For example, the desalination device 1 as described above may be embodied such that the condenser 10 may be implemented as a floating element such that the desalination device 1 may be a floating device, e.g., floating a liquid 4 to be desalinated. In some special illustrative examples herein, a source may be a lake, a river, a creek etc.

Although a desalination device is described above with regard to FIGS. 1 and 2, this does not pose any limitation to the present disclosure. Instead, the above-described desalination device may be employed as a purification device in a purification process of a liquid, such as in a water purification process, for instance. In this regard, it is noted that any liquid to be desalinated and/or purified, in particular not limited to saltwater, may be supplied to such a purification device which may substantially have the same features as described above with regard to FIGS. 1 and 2.

In the above-described embodiments of the present disclosure, the carbon membrane body comprises the structure of microchannels and/or nanochannels in from of a three-dimensional hierarchically disordered network of channels. Due to the complex configuration of pores and/or channels in the carbon membrane body, an improved absorbance of a liquid is achieved.

In the following, illustrative embodiments of a purification carbon membrane body will be described in greater detail with regard to FIG. 3 to 5.

Figures 3A, 3B, 3C, 3D, 3E, 3F, 3G, 3H:
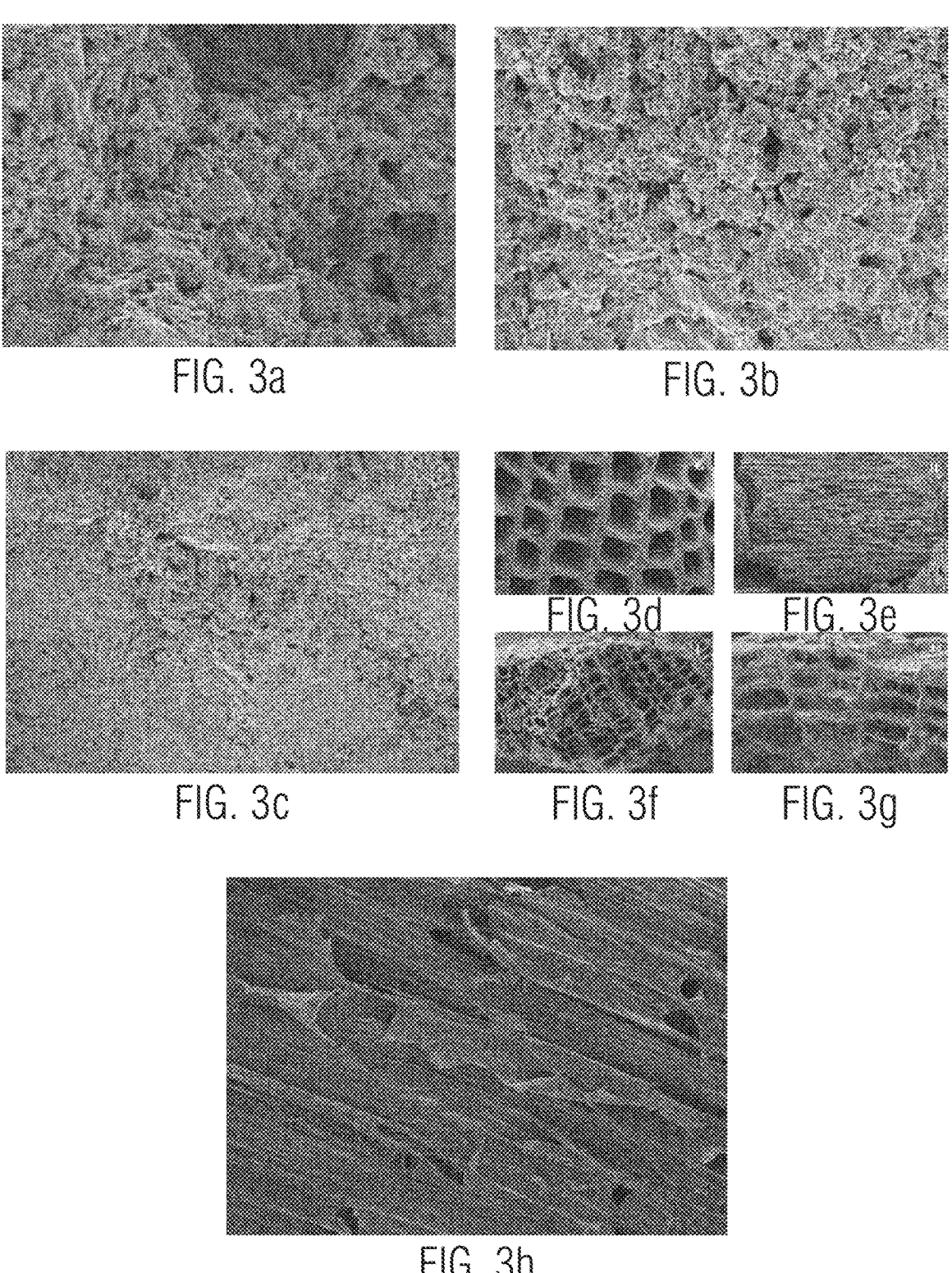
FIGS. 3a to 3c show sectional views of a purification and/or desalination carbon membrane body in accordance with some illustrative embodiments of the present invention.
FIGS. 3d to 3h show sectional views of pieces of carbonized wood in accordance with comparative examples.

FIG. 3A to 3C show a section of a portion of a carbon membrane body at various scales of magnification, where the magnification decreases from FIG. 3A to 3C. The carbon membrane body shown in FIG. 3A to 3C is made of compressed charcoal powder. From an analysis of FIG. 3A to 3C, it is found that the illustrated carbon membrane body has a structure of microchannels and/or nanochannels with a porosity in a range from about 25% to about 28%. Furthermore, the structure of microchannels and/or nanochannels have a first set of pores with radii in a range from about 100 to about 300 nm, and a second set of pores with radii in a range from about 2.4 μm to about 5.0 μm. Also, a density of pores in the first set of pores was determined as about 153×10$^3$ pores/mm$^2$ and a density of pores in the second set of pores was determined as of about 10$^3$ pores/mm$^2$.

In comparison to FIG. 3A to 3C, various sectional views of pieces of carbonized wood at different magnifications are shown in FIG. 3D to 3H as comparative examples. With regard to FIG. 3D to 3H, the inventors report two different types of carbonized wood where the size of pores of carbonized wood in FIG. 3D to 3G is slightly different from the one in FIG. 3H. In any case, the pieces of carbonized wood as shown in FIG. 3D to 3H present channels developed along a main direction. It is clearly seen from FIG. 3D to 3H that carbonized wood usually presents bigger pores with respect to the carbon membrane body shown in FIG. 3A to 3C. Furthermore, the size of pores of carbonized wood depends on the type of carbonized wood and, when compared to the carbon membrane body of FIG. 3A to 3C, the average pore radius is typically larger than 10 μm. The pores of carbonized wood are highly unidirectional and there is scarce to no communication between a pore channel and the next (see FIG. 3E). Therefore, while the side facing the aperture of the pores (FIG. 3D) can absorb water, the other sides of the piece of carbonized wood cannot do it efficiently.

With regard to FIG. 4a to 4d, a hydrophilicity difference between a carbon membrane body in accordance with illustrative embodiments of the present disclosure and a piece of carbonized wood is illustrated during a time interval from t=0 s to t=0.048 s in time steps of 0.016 s is illustrated. The top images in FIG. 4a to 4d show the carbon membrane body, while the bottom images in FIG. 4a to 4d show the piece of carbonized wood.

Figures 4A, 4B, 4C, 4D:
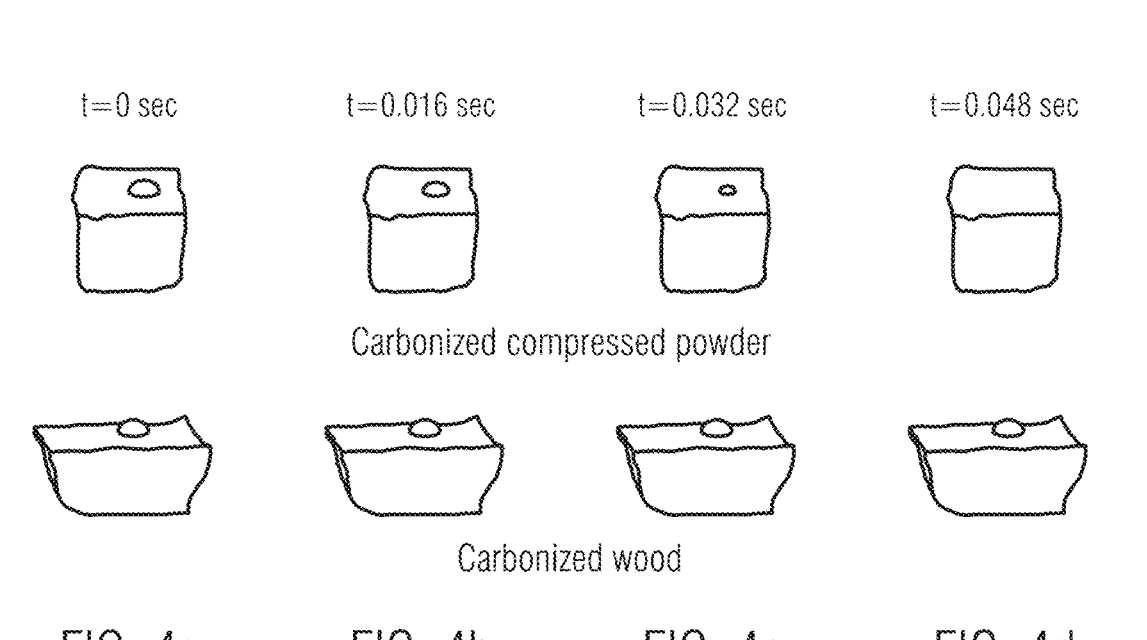
FIG. 4a to 4d show absorbance of a drop of water by a purification and/or desalination carbon membrane body in accordance with some illustrative embodiments of the present invention in comparison to absorbance of a water drop with a piece of carbonized wood in a given time interval at equal times.

Referring to FIG. 4a, a drop of a liquid to be desalinated and/or purified, e.g. water, is disposed on an upper surface of each of the carbon membrane body (see top image in FIG. 4a) and the piece of carbonized wood (see bottom image in FIG. 4a). In an illustrative experiment that the inventors performed, a 1 ml drop of water was deposited on the upper surface of the carbon membrane body and the piece of carbonized wood with a glass Pasteur pipette. As shown in the sequence of images from FIG. 4a to 4d, the drop of liquid is substantially absorbed by the carbon membrane body until t=0.048 s (see top image in FIG. 4d), while the drop on the piece of carbonized wood is substantially unaffected in the time interval from FIG. 4a to 4d. That is, there is substantially no absorbance of the drop by the piece of carbonized wood in the time interval shown in FIG. 4a to 4d.

Figure 5:
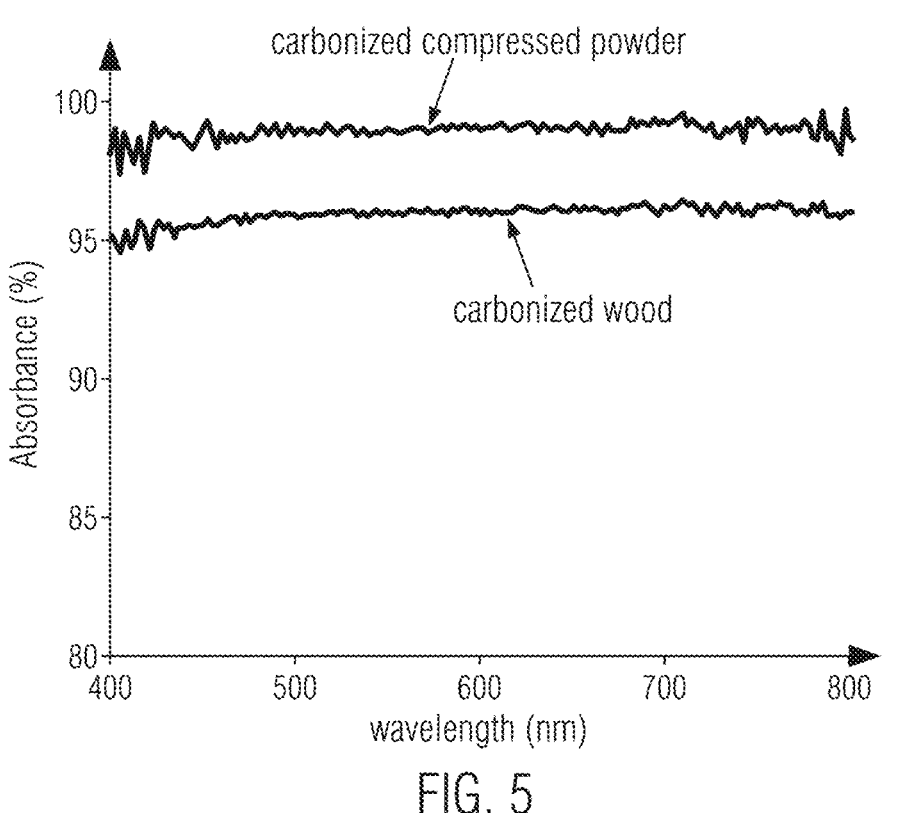
FIG. 5 shows an absorption spectrum of carbonized wood in comparison to a purification and/or desalination carbon membrane body in accordance with some illustrative embodiments of the present invention.

With regard to FIG. 5, an absorption spectrum of the piece of carbonized wood in comparison with the carbon membrane body of FIG. 4a to 4d is schematically illustrated, indicating absorbance of the carbon membrane body being greater than absorbance of the piece of carbonized wood in the wavelength range indicated on the abscissa of FIG. 5. In particular, while carbonized wood substantially shows an absorbance of about 95% in the illustrated wavelength region, the absorbance of the carbon membrane body is substantially higher by about 2% of the absorbance of carbonized wood.

In accordance with some illustrative embodiments of the present disclosure, a carbon membrane body as described above may be obtained in an illustrative process, wherein at least one ingredient for forming a carbon membrane body is provided, e.g., in form of a carbon material as described above. In an initial step, the provided ingredient(s) may be ground. For example, the ingredient(s) may be ground in fines with particle sizes in a range from about 1 nm to about 10 mm, preferably in a range from about 1 nm to about 5 mm, and more preferably in a range from about 1 nm to 2 mm. An endpoint of such a grinding process may be detected by inspecting particle sizes, for example.

Concurrently with grinding, prior to grinding or subsequently, a certain amount of at least one second ingredient may be soaked in at least one third ingredient. In accordance with some special but non-limiting example herein, 1 kg of the at least one second ingredient may be soaked in the at least one third ingredient for 3 hours.

Subsequently, the ground first ingredient is added to the second and third ingredients. For example, 7 kg of ground first ingredient may be added.

Thereafter, a hydraulic press is used to give shape to the material composition of the first to third ingredients. Herein, the material composition is filled into molds of the hydraulic press and a pressure is applied to each mold, for example in the range between 10 and 100 bar. In accordance with some special illustrative embodiments herein, the material composition may be pressed into a cubic shaped charcoal briquette. This does not pose any limitation to the present disclosure and a pressed material composition of any shape may be obtained instead, depending on the molds used.

Thereafter, at least one hole may be created in the pressed material composition. For example, two series of holes (between 1 and 2 mm in diameter, for example) and, e.g., perpendicular with respect to each other (along the horizontal direction) spanning two different planes at a distance between each other in the range of 30% to 50% of the height of the cubes obtained in the previous step. However, this does not pose any limitation on the present disclosure and holes may be created during the pressing stage instead.

In a last step, the obtained material composition may be dried, e.g., naturally under sunlight or in a particular drying environment with artificial light and controlled atmosphere.

In accordance with some illustrative embodiments herein, the first ingredient(s) may be given by any form of amorphous carbon that is produced when wood, peat, bones, cellulose, or other carbonaceous substances are heated with little or no air present or directly (fossil) coal. The second ingredient(s) may be given by a binder such as (without limitation) starch, acacia gum, paper pulp, clay, or organic waste, for example. The third ingredient(s) may be water or an aqueous liquid with a pH value of 7.

The material composition obtained in the above last step may be used as a carbon membrane body, thereby realizing both the function of solar absorber and water transportation in a purification device. Depending on the specific details of the recipe, adopted porosity in the range of 5% to 50% may be reached. In addition, the material obtained possess superior liquid transportation quality respect to any of its bare counterpart that did not undergo the process described previously (see the comparison with carbonized wood as illustrated above with regard to FIG. 4a to 4d and FIG. 5).

Indeed, the process guarantees intrinsic liquid sucking properties because the material is characterized by an isotropic and homogeneous network of micro/nano-channels, homogeneous meaning that if we divide the volume into a grid, every element of the grid will be made up by a network of micro/nano-channels with parameters as described above. On the contrary, lump carbonized materials possess inhomogeneous porosity properties (they differ according to the direction you look at it) and often high directional micro/nanochannels.

With regard to FIG. 6a to 6f, isotropy of pore scales for a body of carbonized compressed powder according to a special illustrative example and a body of carbonized wood as a comparative example will be illustrated. According to this special illustrative example, it is pointed out that compressed carbonized biomass powder or fossil charcoal powder is a form of carbon that presents a higher amount of small low volume pores, which dramatically increase the surface area available for liquid absorption with respect to their raw material counterpart of carbonized wood.

Referring to FIG. 6a to 6f, different magnified views of a body of carbonized compressed powder and a body of carbonized wood along three different directions are shown. Each of these figures shows a volumetric network of pores which is distributed following two different scales of pores dimensions S1 and S2.

Figures 6A, 6B, 6C, 6D, 6E, 6F:
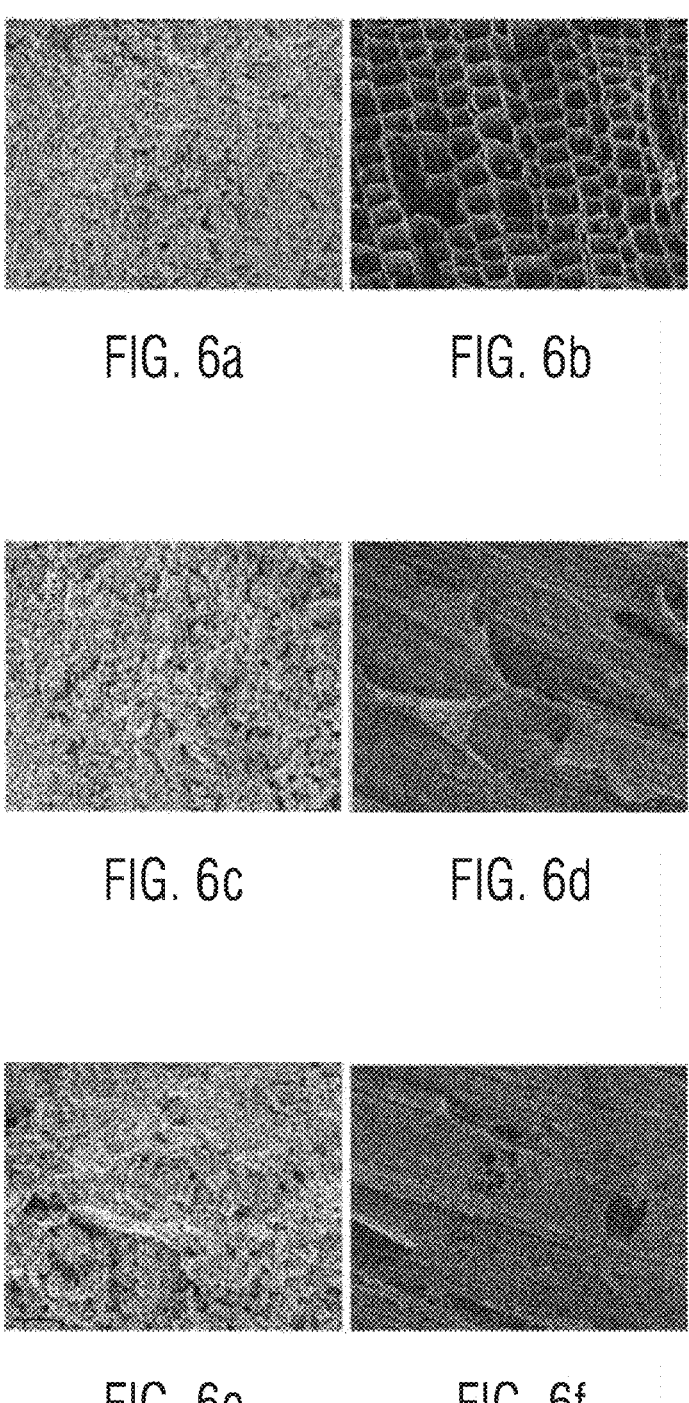
FIGS. 6a, 6c, and 6e show different views of a body of carbonized compressed powder in accordance with some illustrative embodiments of the present disclosure.
FIGS. 6b, 6d, and 6f show different views of a body of carbonized wood in accordance with a comparative example.

FIG. 6a shows a view along a z direction onto the body of carbonized compressed powder. In particular, the image of FIG. 6a represents a view of an xy plane of the body of carbonized compressed powder in an xyz coordinate system which applied with a common origin to the body of carbonized compressed powder illustrated in FIGS. 6a, 6c, and 6e and the body of carbonized wood illustrated in FIGS. 6b, 6d, and 6f. In FIGS. 6a, 6c, and 6e, the inventors identified a first set of pores given by pores having a pore radius in the range from about 100 nm to about 300 nm, and s second set of pores given by pores having a pore radius of at least about 2.5 μm. After analysing FIG. 6a, the inventors determined a pore dimension scale $S1 \approx 153 \times 10^3$ pores/mm$^2$ for the first set of pores and a pore dimension scale $S2 \approx 1 \times 10^3$ pores/mm$^2$ for the second set of pores.

FIG. 6b shows a view along the z direction onto the body of carbonized wood. In particular, the image of FIG. 6b represents a view of an xy plane of the body of carbonized wood. After analysing FIG. 6b, the inventors determined a pore dimension scale $S1 \approx 0$ pores/mm$^2$ for pores of the first set of pores and a pore dimension scale $S2 \approx 5 \times 10^3$ pores/mm$^2$ for pores of the second set of pores.

FIG. 6c shows a view along a y direction onto the body of carbonized compressed powder. In particular, the image of FIG. 6b represents a view of an xz plane of the body of carbonized compressed powder. After analysing FIG. 6b, the inventors determined a pore dimension scale $S1 \approx 126 \times 10^3$ pores/mm$^2$ for pores of the first set of pores and a pore dimension scale $S2 \approx 1.3 \times 10^3$ pores/mm$^2$ for pores of the second set of pores.

FIG. 6d shows a view along the y direction onto the body of carbonized wood. In particular, the image of FIG. 6d represents a view of an xz plane of the body of carbonized wood. After analysing FIG. 6d, the inventors determined a pore dimension scale $S1 \approx 0$ pores/mm$^2$ for pores of the first set of pores and a pore dimension scale $S2 \approx 10 \times 10^3$ pores/mm$^2$ for pores of the second set of pores.

FIG. 6e shows a view along an x direction onto the body of carbonized compressed powder. In particular, the image of FIG. 6e represents a view of an yz plane of the body of carbonized compressed powder. After analysing FIG. 6e, the inventors determined a pore dimension scale $S1 \approx 147 \times 10^3$ pores/mm$^2$ for pores of the first set of pores and a pore dimension scale $S2$ $1.5 \times 10^3$ pores/mm$^2$ for pores of the second set of pores.

FIG. 6f shows a view along the x direction onto the body of carbonized wood. In particular, the image of FIG. 6f represents a view of an yz plane of the body of carbonized wood. After analysing FIG. 6f, the inventors determined a pore dimension scale $S1 \approx 0$ pores/mm$^2$ for pores of the first set of pores and a pore dimension scale $S2 \approx 25 \times 10^3$ pores/mm$^2$ for pores of the second set of pores.

When considering the above analysis of FIG. 6a to 6f, the inventors found that the properties of pore distribution belonging to the two-dimension scales S1 and S2 are isotropic meaning that the number of pores per mm$^2$ for the pore dimensions S1 and S2, respectively, substantially remain the same along all directions. Accordingly, the term "isotropy" may be understood in an illustrative way by determining pore dimension scales for different sets of pores having different radii and observing that the pore dimension scales do substantially not change. For example, pore dimension scales may be considered as "substantially equal" when not deviating by more than 30% of a mean pore dimension scale, preferably by not more than 15%, such as by not more than 10% or not more than 5% or not more than 1%. In the context of the present disclosure, an isotropy may be considered as indicating that at least one pore dimension scale of pores of a carbon membrane body determined in at least two different directions, is substantially equal.

In the various illustrative embodiments of the present disclosure, a carbon membrane body allows to reduce the presence of dissolved solids in a liquid for purification of the liquid. For example, levels of potability of a liquid may be achieved such as in a liquid purification process.

As an additional or alternative advantage of a desalination device in accordance with the various illustrative embodiments described above, such a device may be employed in the production of salt.

Any of the above-described desalination and/or purification devices may be embodied to reach any desired and/or required degree of desalination and/or purification in the obtained desalinated and/or purified liquid. For example and without limitation, any standard as set by a legal norm and/or any legal requirement may be reached when employing any of the above-described desalination and/or purification devices in a desalination and/or purification process or any other degree of desalination and/or purification may be achieved not bound by any legal norm and/or legal requirement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In summary of the detailed description above, the following embodiments are explicitly disclosed.

In accordance with embodiment 1, a desalination and/or purification device (see reference numeral 1 in the Figures)

is provided, the desalination and/or purification device comprising: a carbon membrane body (see reference numeral 6 in the Figures) comprising a carbon surface (see reference numeral 6*s* in the Figures), a structure (see reference numeral 6*c* in the Figures) of microchannels and/or nanochannels at least partially permeating the carbon membrane body (see reference numeral 6 in the Figures) and ending at openings (see reference numeral 6*o* in the Figures) at the carbon surface (see reference numeral 6*s* in the Figures), and a liquid transportation structure (see reference numeral 8 in the Figures) extending at least partially through the carbon membrane body (see reference numeral 6 in the Figures) without being exposed at the carbon surface (see reference numeral 6*s* in the Figures), the liquid transportation structure (see reference numeral 8 in the Figures) being arranged and configured to supply the structure (see reference numeral 6*c* in the Figures) of microchannels and/or nanochannels of the carbon membrane body (see reference numeral 6 in the Figures) with a liquid to be desalinated and/or purified, and a condenser (see reference numeral 10 in the Figures) arranged above the carbon membrane body (see reference numeral 6 in the Figures). For example, the structure (see reference numeral 6*c* in the Figures) of microchannels and/or nanochannels of the carbon membrane body (see reference numeral 6 in the Figures) may be an at least two-level disordered network of channels.

In accordance with embodiment 2, the desalination and/or purification device (see reference numeral 1 in the Figures) of embodiment 1 is provided, wherein the carbon membrane body (see reference numeral 6 in the Figures) is substantially completely formed of one material and/or wherein the purification device (see reference numeral 1 in the Figures) is configured to float on the liquid (see reference numeral 4 in the Figures) to be desalinated and/or purified.

In accordance with embodiment 3, the desalination and/or purification device (see reference numeral 1 in the Figures) of embodiment 1 or embodiment 2 is provided, wherein the carbon membrane body (see reference numeral 6 in the Figures) is formed of compressed charcoal powder or made of compressed coal powder or of a compressed carbonized material.

In accordance with embodiment 4, the desalination and/or purification device (see reference numeral 1 in the Figures) of any of embodiments 1 to 3 is provided, wherein the liquid transportation structure (see reference numeral 8 in the Figures) comprises at least one capillary element (see reference numeral 8*f* in the Figures) configured to draw liquid from a reservoir (see reference numeral 2 in the Figures) or a source of liquid providing the liquid (see reference numeral 4 in the Figures) to be purified to the carbon membrane body (see reference numeral 6 in the Figures) by capillary forces.

In accordance with embodiment 5, the desalination and/or purification device (see reference numeral 1 in the Figures) of embodiment 4 is provided, wherein the capillary element (see reference numeral 8*f* in the Figures) comprises a wick element.

In accordance with embodiment 6, the desalination and/or purification device (see reference numeral 1 in the Figures) of embodiment 4 or 5 is provided, wherein the at least one capillary element (8*f*) is partially encapsulated at one end by the carbon membrane body (6), the at least one capillary element (8*f*) being in communication with the structure (60) of microchannels and/or nanochannels.

In accordance with embodiment 7, the desalination and/or purification device (see reference numeral 1 in the Figures) of one of embodiments 4 to 6 is provided, wherein the liquid transport structure (see reference numeral 8 in the Figures) comprises a plurality of capillary elements (see reference numeral 8*f* in the Figures) which extend in at least one plane which is substantially parallel to the carbon surface (see reference numeral 6*s* in the Figures) of the carbon membrane body (see reference numeral 6 in the Figures) within the carbon membrane body (see reference numeral 6 in the Figures).

In accordance with embodiment, the desalination and/or purification device (see reference numeral 1 in the Figures) of one of embodiments 1 to 7 is provided, further comprising a Peltier element (see reference numeral 30 in the Figures) thermally coupled at one node with the carbon membrane body (see reference numeral 6 in the Figures).

In accordance with embodiment 9, the desalination and/or purification device (see reference numeral 1 in the Figures) of one of embodiments 1 to 8 is provided, further comprising a thermal insulator (see reference numeral 18 in the Figures) arranged between the carbon membrane body (see reference numeral 6 in the Figures) and a liquid to be desalinated and/or purified.

In accordance with embodiment 10, the desalination and/or purification device (see reference numeral 1 in the Figures) of embodiment 9 is provided, wherein the thermal insulator (see reference numeral 18 in the Figures) has at least one opening formed therein, the liquid transportation structure (see reference numeral 8 in the Figures) being guided through the at least one opening from in the thermal insulator (see reference numeral 18 in the Figures) from the carbon membrane body (see reference numeral 6 in the Figures) to the liquid to be desalinated and/or purified.

In accordance with embodiment 11, a method of desalinating and/or purifying a liquid by using the purification device (see reference numeral 1 in the Figures) of one of embodiments 1 to 10 is provided, wherein the method comprises: providing the liquid (see reference numeral 4 in the Figures) to be purified, bringing the liquid transportation structure (see reference numeral 8 in the Figures) into communication with the liquid (see reference numeral 4 in the Figures) to be purified, exposing the carbon surface (see reference numeral 6*s* in the Figures) of the carbon membrane body (see reference numeral 6 in the Figures) to radiation energy, and collecting condensate (see reference numeral 12*c* in the Figures) generated by the condenser (see reference numeral 10 in the Figures) in a condensate collector (see reference numeral 12 in the Figures).

In accordance with embodiment 12, a desalination and/or purification carbon membrane is provided, the desalination and/or purification carbon membrane comprising a carbon membrane body (see reference numeral 6 in the Figures) having a structure (see reference numeral 6*c* in the Figures) of microchannels and/or nanochannels, and a carbon surface (see reference numeral 6*s* in the Figures), wherein the structure (see reference numeral 6*c* in the Figures) of microchannels and/or nanochannels of the carbon membrane body (see reference numeral 6 in the Figures) is an at least two-level disordered network of channels, wherein the carbon membrane body (see reference numeral 6 in the Figures) has at least one hole formed therein at least partially extending through the carbon membrane body (see reference numeral 6 in the Figures), the at least one hole not being formed in the carbon surface (see reference numeral 6*s* in the Figures).

In accordance with embodiment 13, the desalination and/or purification carbon membrane of embodiment 12 is provided, wherein the hole extends through the carbon membrane body along a direction that is substantially different from a direction normal to the carbon surface (see reference numeral 6s in the Figures).

In accordance with embodiment 14, the desalination and/or purification carbon membrane of embodiment 12 or 13 is provided, wherein the carbon membrane body (see reference numeral 6 in the Figures) is substantially completely formed of one material and/or the desalination and/or purification carbon membrane further comprises a liquid transportation structure (see reference numeral 8 in the Figures) extending at least partially through the carbon membrane body (see reference numeral 6 in the Figures), the liquid transportation structure (see reference numeral 8 in the Figures) being arranged and configured to supply the structure (see reference numeral 6c in the Figures) of microchannels and/or nanochannels of the carbon membrane body (see reference numeral 6 in the Figures) with a liquid to be desalinated and/or purified.

In accordance with embodiment 15, the desalination and/or purification carbon membrane of one of embodiments 12 to 14 is provided, wherein the carbon membrane body (see reference numeral 6 in the Figures) is formed of compressed charcoal powder or of compressed coal powder.

In accordance with embodiment 16, the desalination and/or purification carbon membrane of one of embodiments 12 to 15 is provided, wherein the carbon membrane body (see reference numeral 6 in the Figures) has at least two rows of holes formed therein, each row comprising at least two holes arranged in a plane which is substantially parallel to the carbon surface (see reference numeral 6s in the Figures).

In accordance with embodiment 17, the desalination and/or purification device (see reference numeral 1 in the Figures) of any of embodiments 1 to 10 is provided, wherein the carbon membrane body (see reference numeral 6 in the Figures) is provided by the desalination and/or purification carbon membrane of one of embodiments 12 to 16.

What is claimed is:

1. A desalination and/or purification device, comprising:
a carbon membrane body including:
   a carbon surface,
   a structure of microchannels and/or nanochannels at least partially permeating the carbon membrane body and ending at openings at the carbon surface, and
   a liquid transportation structure extending at least partially through the carbon membrane body without being exposed at the carbon surface, the liquid transportation structure including a hydrophilic wick element received in a blind bore that opens at an internal surface of the carbon membrane body and terminates upstream of the carbon surface, the liquid transportation structure being arranged and configured to supply the structure of microchannels and/or nanochannels of the carbon membrane body with a liquid to be desalinated and/or purified; and
a condenser arranged above the carbon membrane body, wherein the structure of microchannels and/or nanochannels of the carbon membrane body is an at least two-level disordered network of channels.

2. The desalination and/or purification device of claim 1, wherein the carbon membrane body is at least partially formed of carbon and/or wherein the desalination and/or purification device is configured to float on the liquid to be desalinated and/or purified.

3. The desalination and/or purification device of claim 1, wherein the carbon membrane body is formed of compressed charcoal powder or made of compressed coal powder or of a compressed carbonized material.

4. The desalination and/or purification device of claim 1, wherein the liquid transportation structure further comprises at least one additional capillary element configured to draw liquid from a reservoir or a source of liquid providing the liquid to be purified to the carbon membrane body by capillary forces.

5. The desalination and/or purification device of claim 4, wherein the at least one additional capillary element comprises a wick element.

6. The desalination and/or purification device of claim 4, wherein the at least one additional capillary element is partially encapsulated at one end by the carbon membrane body, the at least one additional capillary element being in communication with the structure of microchannels and/or nanochannels.

7. The desalination and/or purification device of claim 4, wherein the liquid transport structure comprises a plurality of capillary elements which extend in at least one plane which is substantially parallel to the carbon surface of the carbon membrane body within the carbon membrane body.

8. The desalination and/or purification device of claim 1, further comprising a Peltier element thermally coupled at one node with the carbon membrane body.

9. The desalination and/or purification device of claim 1, further comprising a thermal insulator arranged between the carbon membrane body and the liquid to be desalinated and/or purified.

10. The desalination and/or purification device of claim 9, wherein the thermal insulator has at least one opening formed therein, the liquid transportation structure being guided through the at least one opening from in the thermal insulator from the carbon membrane body to the liquid to be desalinated and/or purified.

11. The desalination and/or purification device of claim 1, wherein the carbon membrane body is an at least two-level disordered network of channels, wherein the carbon membrane body has at least one hole formed therein at least partially extending through the carbon membrane body, at least one hole not being formed in the carbon surface.

12. The desalination and/or purification device of claim 1, further comprising a thermal insulation layer interposed between the carbon membrane body and the liquid to be desalinated and/or purified.

13. The desalination and/or purification device of claim 1, wherein the at least two-level disordered network of channels includes a first level having a first mean radius and a second level having a second mean radius greater than the first mean radius, and wherein each level of nanochannels is randomly oriented without a common longitudinal axis.

14. A method of desalinating and/or purifying a liquid by using the desalination and/or purification device of claim 1, wherein the method comprises:
   providing the liquid to be purified;
   bringing the liquid transportation structure into communication with the liquid to be purified;
   exposing the carbon surface of the carbon membrane body to radiation energy; and
   collecting condensate generated by the condenser in a condensate collector.

15. The method of claim 14, wherein the carbon membrane body is formed of compressed charcoal powder or made of compressed coal powder or of a compressed carbonized material.

16. The method of claim 14, wherein the desalination and/or purification device further includes a thermal insulation layer interposed between the carbon membrane body and the liquid to be desalinated and/or purified.

17. The method of claim 14, wherein the at least two-level disordered network of channels includes a first level having a first mean radius and a second level having a second mean radius greater than the first mean radius, and wherein each level of nanochannels is randomly oriented without a common longitudinal axis.

18. A desalination and/or purification carbon membrane, comprising:

a carbon membrane body including:

a structure of microchannels and/or nanochannels;

a carbon surface;

a liquid transportation structure extending at least partially through the carbon membrane body without being exposed at the carbon surface, the liquid transportation structure including a hydrophilic wick element received in a blind bore that opens at a bottom surface of the carbon membrane body and terminates upstream of the carbon surface, the liquid transportation structure being arranged and configured to supply the structure of microchannels and/or nanochannels of the carbon membrane body with a liquid to be desalinated and/or purified, wherein the structure of microchannels and/or nanochannels of the carbon membrane body is an at least two-level disordered network of channels, wherein the carbon membrane body has at least one hole formed therein at least partially extending through the carbon membrane body, the at least one hole not being formed in the carbon surface and the at least one hole extending through the carbon membrane body along a direction other than normal to the carbon surface.

19. The desalination and/or purification carbon membrane of claim 18, further comprising a thermal insulation layer interposed between the carbon membrane body and the liquid to be desalinated and/or purified.

20. The desalination and/or purification carbon membrane of claim 18, wherein the at least two-level disordered network of channels includes a first level having a first mean radius and a second level having a second mean radius greater than the first mean radius, and wherein each level of nanochannels is randomly oriented without a common longitudinal axis.

* * * * *